United States Patent Office 3,047,610
Patented July 31, 1962

3,047,610
PROCESS FOR PREPARING HIGHLY FLUORINATED ACID CHLORIDES AND NOVEL ESTERS USEFUL THEREIN
Neal O. Brace and William B. McCormack, Wilmington, Del., assignors to E. I. du Pont de Nemours and Company, Wilmington, Del., a corporation of Delaware
No Drawing. Filed Oct. 9, 1958, Ser. No. 766,185
18 Claims. (Cl. 260—463)

This invention relates to a process for preparing highly fluorinated acid chlorides and to highly fluorinated esters which are particularly useful in such process.

The ω-chloroperfluoroalkanoyl chlorides and the perfluoroalkanoyl chlorides, having the structure $$X(CF_2)_n - \overset{O}{\underset{\|}{C}} - Cl$$

wherein X is chlorine or fluorine and n is an integer of from 1 to 22, are valuable acid chlorides, particularly for use as intermediates for conversion to other compounds of known utility such as conversion to the corresponding ω-chloroperfluoroalkanoic acids and perfluoroalkanoic acids which are valuable as surface active agents as disclosed by Brice et al. in United States Patent 2,790,815 and by Diesslin et al. in United States Patent 2,567,011.

Prior processes for making said acid chlorides have been indirect, expensive and unwieldy and frequently require starting materials which are not readily available and are expensive. For example, it has been proposed to oxidize the ω-X-ω'-hydroperfluoroalkanes, $X(CF_2)_nCF_2H$, to the ω-X-perfluoroalkanoyl fluoride with a mixture of nitrogen dioxide (or nitric acid) and chlorine (or bromine). Also, it has been proposed to convert aliphatic carboxylic acids to perfluoroalkanoyl fluorides by electrolysis in the presence of hydrogen fluoride. Such acid fluorides can be converted to the corresponding acids which can then be converted to the acid chlorides.

It is an object of this invention to provide a new, improved and simple process for preparing ω-chloroperfluoroalkanoyl chlorides and perfluoroalkanoyl chlorides. Another object is to provide an inexpensive process for readily preparing said acid chlorides from readily available and relatively inexpensive starting materials. A further object is to provide a new class of chlorinated perfluoroalkanol esters as intermediates for use in the preparation of said acid chlorides and which have additional valuable properties whereby they are useful for many other purposes. Still further objects are to provide new and valuable compounds. Other objects will appear hereinafter.

The above and other objects may be accomplished in accord with this invention which comprises the process of pyrolyzing at a temperature in the range of from about 100° C. to about 350° C. an ester having a structure selected from the group consisting of $$X(CF_2)_n - CCl_2 - O - \overset{O}{\underset{\|}{C}} - O - CCl_2 - (CF_2)_mX$$

$$X(CF_2)_n - CCl_2 - O - \overset{O}{\underset{\|}{C}} - A$$

$$X(CF_2)_n - CCl_2 - O - \overset{O}{\underset{\|}{C}} - (CF_2)_mX$$

$$X(CF_2)_n - CCl_2 - O - \overset{O}{\underset{\|}{C}} - \overset{O}{\underset{\|}{C}} - O - CCl_2 - (CF_2)_mX$$

$$[X(CF_2)_n - CCl_2 - O -]_q \overset{O}{\underset{\uparrow}{P}}(G)_{3-q}$$

and $$[X(CF_2)_n - CCl_2 - O -]_r Si(A)_{4-r}$$

wherein each X is a member of the group consisting of Cl and F, each of n and m is an integer of from 1 to 22,
A represents a member of the group consisting of methyl and chlorine-substituted methyl radicals, G represents a member of the group consisting of OH, Cl, methyl and chlorine-substituted methyl radicals, q is an integer of from 1 to 3, and r is an integer of from 1 to 4. Preferably, the process comprises so pyrolyzing those esters that are obtained by photochlorinating an ester having a structure selected from the group consisting of $$R - \overset{O}{\underset{\|}{C}} - R, \quad R - \overset{O}{\underset{\|}{C}} - A, \quad R - \overset{O}{\underset{\|}{C}} - (CF_2)_mY, \quad R - \overset{O}{\underset{\|}{C}} - \overset{O}{\underset{\|}{C}} - R$$

and $$(R)_q \overset{O}{\underset{\uparrow}{P}}(G)_{3-q} \text{ and } (R)_r Si(A)_{4-r}$$

wherein each R represents a radical of the formula $Y(CF_2)_nCH_2 - O -$ in which Y is a member of the group consisting of H, Cl and F and n is an integer of from 1 to 22, A represents a member of the group consisting of methyl and chlorine-substituted methyl radicals ($CH_3$, $CH_2Cl$, $CHCl_2$ and $CCl_3$), m is an integer of from 1 to 22, q is an integer of from 1 to 3, r is an integer of from 1 to 4, and G is a member of the group consisting of OH, Cl, methyl and chlorine-substituted methyl radicals; employing at least one mole of chlorine for each hydrogen atom in the ester; and continuing said photochlorination until all hydrogen atoms in the radical R have been replaced by chlorine. The pyrolysis of said chlorinated esters in said temperature range results primarily in cleavage of the ester, i.e. cleavage of the alcohol radical from the acid radical, and conversion of each of those radicals to acid chlorides, the $-CCl_2-O-$ group of the alcohol radical being converted to the $$-\overset{O}{\underset{\|}{C}} - Cl$$

A particularly important feature of this invention resides in the provision of the new and valuable esters having the structure $$X(CF_2)_n - CCl_2 - O - \overset{O}{\underset{\|}{C}} - O - CCl_2 - (CF_2)_mX$$

and $$X(CF_2)_n - CCl_2 - O - \overset{O}{\underset{\|}{C}} - (CF_2)_mX$$

as above defined.

The chlorinated esters, which are to be pyrolyzed in the process of this invention, preferably are prepared by the photochlorination of esters of the 1,1-dihydro-ω-Y-perfluoroalkanols having the formula $Y - (CF_2)_n - CH_2OH$ where Y represents H, Cl or F and n is an integer of from 1 to 22. It has been found that the hydrogen atoms of the $-CH_2-$ group in said esters can be readily replaced by chlorine under photochlorination conditions. The chlorinated alcohols of the formula $Y(CF_2)_n - CCl_2 - OH$ are not yet known, and attempts to prepare them by photochlorination of the 1,1-dihydro-ω-Y-perfluoroalkanols have been unsuccessful, but have produced chemically different compounds as disclosed by Neal O. Brace (one of the applicants herein) in United States Patent 2,842,601. Even if such chlorinated alcohols could be prepared, they would be expected to be highly unstable.

It is known that highly fluorinated esters, of the character of the esters of the 1,1-dihydro-ω-Y-perfluoroalkanols, are quite stable to elevated temperatures. It is also well known that the hydrogen atoms on a $-CH_2-$ group adjacent to a $-CF_2-$ group are resistant to replacement by chlorine and that a $-CF_2-$ group stabilizes and greatly reduces the reactivity of chlorine atoms on an adjacent carbon atom. Therefore, it was surprising that the hydrogen atoms of the $-CH_2-$ group in said esters could be readily replaced by chlorine, that the resulting chlorinated esters could be so readily cleaved by pyrolysis, and particularly that the chlorinated alcohol radical would be converted to the acid chloride, i.e. that the —CCl$_2$—O— group would be converted to the —COCl radical.

The esters, which can be photochlorinated to produce the chlorinated esters to be pyrolyzed in the process of this invention, are the carbonate, carboxylate, phosphinate, phosphonate, phosphate, silanate and orthosilicate esters of the 1,1-dihydro-ω-Y-perfluoroalkanols as above defined. The preferred alcohols are the 1,1, ω-trihydroperfluoroalkanols, H(CF$_2$)$_n$—CH$_2$OH wherein $n$ is an integer of from 2 to 22, preferably about 4 to about 10, which can be made by the telomerization of tetrafluoroethylene with methanol as described by Joyce in United States Patent 2,559,628. The 1,1-dihydroperfluoralkanols, F(CF$_2$)$_n$CH$_2$OH, can be made as described by Husted et al. in United States Patent 2,666,797. The esters to be photochlorinated are, in general, known compounds and can be prepared by well known methods, e.g. by reaction of the alcohol with an acid halide or an acid anhydride. The preparation of the acetates is described by Joyce in United States Patent 2,559,628. The mono- and diphosphates are prepared by treating the alcohol with phosphorus pentoxide as described by Benning in United States Patent 2,559,749. The phosphinates and the phosphonates are prepared by reacting the alcohol with the appropriate phosphorus halide derivatives in known manner.

Representative phosphorus-containing esters are as follows:

(a)
$$(CH_3)_2\overset{O}{\overset{\uparrow}{P}}-OCH_2(CF_2)_nY$$

1,1,3-trihydroperfluoropropyl dimethylphosphinate
1,1,5-trihydroperfluoropentyl dimethylphosphinate
1,1,7-trihydroperfluoroheptyl dimethylphosphinate
1,1-dihydroperfluorooctyl dimethylphosphinate
1,1,9-trihydroperfluorononyl dimethylphosphinate, etc.

(b)
$$CH_3\overset{O}{\overset{\uparrow}{P}}-(OCH_2(CF_2)_nY)_2$$

Bis(1,1,3-trihydroperfluoropropyl) methylphosphonate
Bis(1,1,5-trihydroperfluoropentyl) methylphosphonate
Bis(1,1,7-trihydroperfluoroheptyl) methylphosphonate
Bis(1,1,-dihydroperfluorooctyl) methylphosphonate
Bis(1,1,9-trihydroperfluorononyl) methylphosphonate, etc.

(c)
$$Cl\overset{O}{\overset{\uparrow}{P}}-(OCH_2(CF_2)_nY)_2$$

Bis(1,1,3-trihydroperfluoropropyl) chlorophosphonate
Bis(1,1,5-trihydroperfluoropentyl) chlorophosphonate
Bis(1,1,7-trihydroperfluoroheptyl) chlorophosphonate
Bis(1,1-dihydroperfluorooctyl) chlorophosphonate
Bis(1,1,9-trihydroperfluorononyl) chlorophosphonate, etc.

(d)
$$HO-\overset{O}{\overset{\uparrow}{P}}-(OCH_2(CF_2)_nY)_2$$

Bis(1,1,3-trihydroperfluoropropyl) phosphate
Bis(1,1,5-trihydroperfluoropentyl) phosphate
Bis(1,1,7-trihydroperfluoroheptyl) phosphate
Bis(1,1-dihydroperfluorooctyl) phosphate
Bis(1,1,9-trihydroperfluorononyl) phosphate, etc.

(e)
$$\overset{O}{\overset{\uparrow}{P}}-(OCH_2(CF_2)_nY)_3$$

Tris(1,1,3-trihydroperfluoropropyl) phosphate
Tris(1,1,5-trihydroperfluoropentyl) phosphate
Tris(1,1,7-trihydroperfluoroheptyl) phosphate
Tris(1,1-dihydroperfluorooctyl) phosphate
Tris(1,1,9-trihydroperfluorononyl) phosphate, etc.

The silanates may be prepared by reacting the alcohol with a hydrocarbohalogenosilane such as dimethyldichlorosilane, representative silanates being disclosed by Holt and Walker in their copending United States application Serial No. 529,923, filed August 22, 1955, now U.S. Patent 2,928,857. The orthosilicates are prepared by reacting the alcohol with silicon tetrachloride in known manner. Representative silicon-containing esters are as follows:

Bis(1,1,7-trihydroperfluoroheptyl) dimethylsilanate
Tris(1,1,7-trihydroperfluoroheptyl) methylsilanate
Bis(1,1,9-trihydroperfluorononyl) dimethylsilanate
1,1,15-trihydroperfluoropentadecyl trimethylsilanate
Bis(1,1,11-trihydroperfluoroundecyl) dimethylsilanate
Bis(1,1-dihydroperfluorooctyl) dimethylsilanate
Tetrakis(1,1,3-trihydroperfluoropropyl) orthosilicate
Tetrakis(1,1,5-trihydroperfluoropentyl) orthosilicate
Tetrakis(1,1,7-trihydroperfluoroheptyl) orthosilicate
Tetrakis(1,1,9-trihydroperfluorononyl) orthosilicate, etc.

The carbonate esters are readily prepared from 2 moles of the alcohol and 1 mole of phosgene in the presence of an acid acceptor such as pyridine. Bis(1,1,5-trihydroperfluoropentyl) carbonate,

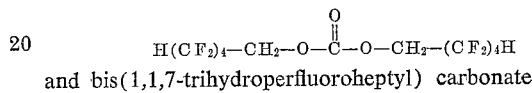

and bis(1,1,7-trihydroperfluoroheptyl) carbonate

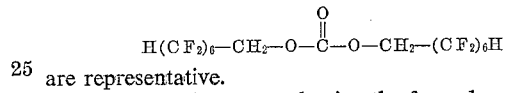

are representative.

The carboxylate esters, having the formula $$Y(CF_2)_n-CH_2-O-\overset{O}{\overset{\|}{C}}-(CF_2)_mY \quad (or\ R-\overset{O}{\overset{\|}{C}}-(CF_2)_mY)$$

are prepared by standard esterification procedures wherein the alcohol is reacted with a ω-hydroperfluoroalkanoic acid, with a ω-chloroperfluoroalkanoic acid, or with a perfluoroalkanoic acid, preferably with the acid chloride of such an acid. The ω-hydroperfluoroalkanoic acids are described by Berry in United States Patent 2,559,629, the ω-chloroperfluoroalkanoic acids are described by Brice et al. in United States Patent 2,790,815 and are more readily prepared by hydrolysis of the novel esters of this invention, and the perfluoroalkanoic acids are described by Diesslin et al. in United States Patent 2,567,011. Representative carboxylate esters of this class are:

1,1,2-trihydro-2,2-difluoroethyl difluoroacetate
1,1,2-trihydro-2,2-difluoroethyl trifluoroacetate
1,1,5-trihydroperfluoropentyl 5-hydroperfluorovalerate
1,1,7-trihydroperfluoroheptyl 7-hydroperfluoroheptanoate
1,1,7-trihydroperfluoroheptyl perfluorobutyrate
1,1,9-trihydroperfluorononyl 9-hydroperfluorononanoate
1,1,11-trihydroperfluoroundecyl perfluorobutyrate
1,1,13-trihydroperfluorotridecyl 13 - hydroperfluorotridecanoate
1,1,13-trihydroperfluorotridecyl 17-hydroperfluoroheptadecanoate
1,1,17-trihydroperfluoroheptadecyl 17-hydroperfluoroheptadecanoate The esters of the 1,1-dihydro-ω-Y-perfluoroalkanols are subjected to direct photochlorination in a reaction zone to replace the hydrogen atoms in the —CH$_2$— group of the alcohol radical by chlorine. By direct photochlorination is meant contacting the ester in a reaction zone with gaseous chlorine while subjecting the ester to actinic light under reaction conditions such that the chlorine replaces hydrogen atoms in the ester molecule. Any general source of radiation giving off actinic light can be used. An ordinary sun lamp provides adequate radiation, particularly for the photochlorination of the esters of the inorganic acids such as the carbonates, phosphinates, phosphonates, phosphates, silanates and orthosilicates. A mercury vapor arc lamp, which affords an intense source of ultraviolet light, may be used, and will be preferred for the photochlorination of the esters of the organic carboxylic acids. It is recommended that the use of rubber tubing be avoided as connections in the apparatus for chlorination.

The chlorine is passed into a reaction zone containing the ester. The optimum rate of the addition of chlorine is such that a slight excess of chlorine is maintained in the reaction mixture. By a slight excess is meant that some unreacted chlorine is always present in the reaction zone and a small fraction of unreacted chlorine passes through the reaction zone. If chlorine is added too rapidly, in addition to being wasteful, the sweep of the gas will tend to strip off any acid chloride product from the reaction zone. The slight excess of chlorine is obtained by adjusting the rate of addition of the chlorine to the reaction zone so that a pale yellow color of dissolved chlorine is maintained in the reaction zone until the photochlorination is completed as indicated by the ester ceasing to absorb chlorine, appreciable yellow color of chlorine remaining in the reaction mixture for some time after the feeding of fresh chlorine to the reaction zone is discontinued. The amount of chlorine employed should be equal to at least one mole of chlorine for each atom of hydrogen present in the ester. Preferably, for reasons of economy, between one and two moles of chlorine should be used for each atom of hydrogen. The hydrogen atoms here referred to include those attached to carbon in the acid radicals of the esters, as well as the hydrogen atoms in the alcohol radical. Usually, some chlorine is consumed by at least partial replacement of the hydrogen atoms attached to carbon in the acetate, methyl phosphinate, methyl phosphonate, methyl silanate, and like acid radicals and by replacement of the hydrogen atoms in the ω-hydroperfluoroalkanoic acid radicals, when present in the ester molecule. Esters of the character of said acetates, phosphinates, phosphonates and silanates, which contain hydrocarbon radicals above methyl (i.e. 2 or more carbon atoms), are operable but consume correspondingly larger amounts of chlorine, whereby they are uneconomical and undesirable for the purposes of this invention.

Ordinarily, the photochlorination is carried out at temperatures in the range of from about 50° C. to about 150° C., preferably at from about 50° C. to about 130° C. At temperatures materially below 50° C., the photochlorination goes very slowly. At temperatures materially above 150° C., pyrolysis and other side reactions tend to take place, particularly with the less stable esters, resulting in decrease in yield of the chlorinated ester. Some of the chlorinated esters tend to pyrolyze and cleave at the temperature of the photochlorination, the rate of pyrolysis being slow at the lower temperatures and increasing with increase in the temperature. It is preferred to first prepare the chlorinated esters and then to pyrolyze them in a separate step. Also, it is desirable to prepare and recover some of the chlorinated esters for other valuable uses. Therefore, it is usually preferred to employ photochlorination temperatures below the pyrolysis temperature of the chlorinated ester or at which pyrolysis of the chlorinated ester is slow.

The chlorinated esters, resulting from the photochlorination, are cleaved (decomposed) by pyrolyzing them at an elevated temperature, usually above the temperature employed in the photochlorination step. The reaction, which takes place upon pyrolysis, may be represented generically by the equation:

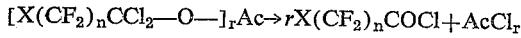

wherein X represents Cl or F, Ac represents the acid radical and $r$ is an integer of from 1 to 4. Thus, the chlorinated polyfluoro alcohol radical is split off and converted to an acid chloride. Also, the acid radical of the ester is converted to its acid chloride which can then be used for acylating more alcohol to form additional amounts of ester suitable for further chlorination and pyrolysis in the process of this invention. For example, pyrolysis (1) of the chlorinated carbonates yields phosgene, (2) of the chlorinated acetates yields trichloroacetyl chloride, (3) and of the chlorinated oxalates yields oxalyl chloride. Also, in the case of the chlorinated symmetrical carbonates wherein the two alcohol radicals are identical and in the case of the chlorinated symmetrical carboxylates of the formula

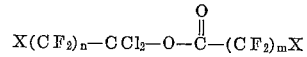

wherein both X's are the same and $n$ and $m$ represent the same integer, pyrolysis yields two moles of the desired acid chloride from each mole of the ester, and such symmetrical esters are the most preferred classes of esters for this process.

The pyrolysis of the chlorinated esters is preferably carried out at a temperature in the range of from about 100° C. to about 350° C. at which cleavage of the ester occurs, particularly at a temperature at which the cleavage takes place at the desired rate. The temperature at which pyrolysis takes place, particularly at a practical rate, varies with the specific ester, and appears to depend largely on the acid radical therein. In general, the esters of the inorganic acids, e.g. the carbonate esters, pyrolyze at the lower temperatures, some of them starting to pyrolyze at temperatures materially below 100° C. down to about 50° C. but usually not at a practical rate, and it is preferred to employ a temperature of at least 100° C. for such esters. Also, in general, the esters of the organic carboxylic acids require temperatures in the upper part of the range, e.g. from about 180° C. to about 300° C., particularly to obtain pyrolysis at a practical rate. The temperature, required for pyrolysis, can be materially decreased by conducting the pyrolysis in the presence of a catalyst, such as sodium fluoride. The use of such catalyst is particularly desirable in the pyrolysis of the esters of the carboxylic acids, whereby the pyrolysis temperature can be decreased from about 190° C. to about 100° C.

The chlorinated carboxylate esters of the formula

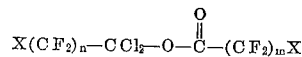

wherein each X represents a member of the group consisting of Cl and F and each of $n$ and $m$ represents an integer of from 1 to 22, and the chlorinated carbonate esters of the formula

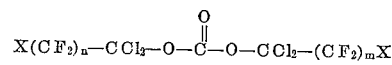

wherein each X represents a member of the group consisting of Cl and F and each of $n$ and $m$ represents an integer of from 1 to 22, are very valuable new compounds. These groups of esters may be represented by the generic formula

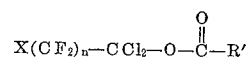

wherein R' is a radical of the group consisting of —$(CF_2)_mX$ and —O—$CCl_2$—$(CF_2)_mX$ and each of X, $n$ and $m$ are as indicated above, it being understood that the two X's may be the same or different and $n$ and $m$ may represent the same or different integers. These esters are valuable intermediates for pyrolysis to polyfluoro acid chlorides, each molecule thereof yielding two molecules of such acid chlorides which may be the same or different depending upon whether the two X's and $n$ and $m$ are the same or different.

In addition, the above new chlorinated esters have other novel, unusual valuable properties or reactivities whereby they are useful for other purposes. The chlorinated carboxylate esters, except those of the higher molecular weights which are solids, are colorless liquids. They possess indices of refraction different from and higher than either the corresponding alcohol or corresponding acid. They possess infrared spectra showing no carbon-hydrogen bonds. The C=O stretching absorption is at 5.45 microns. The lower molecular weight members have a suffocating odor, and may be toxic. They do not behave as ordinary esters but are all highly reactive compounds which react as if they were dimeric acid chlorides, $(RCOCl)_2$. Ordinary esters, when reacted with other alcohols, interchange the alcohol portion to give a new ester and alcohol corresponding to that portion of the original ester. However, when the chlorinated carboxylic esters of this invention react with an alcohol, 2 moles of a new ester are obtained and 2 moles of hydrogen chloride (HCl) are liberated in a rapid exothermic manner:

$$Cl(CF_2)_nCCl_2OOC(CF_2)_mX + 2ROH$$
$$\rightarrow Cl(CF_2)_nCOOR + X(CF_2)_mCOOR + 2HCl$$

Similarly with amines, these esters react to give 2 moles of amide and 2 moles of an ammonium chloride:

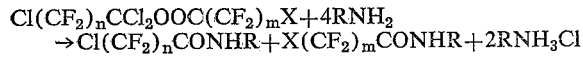
$$Cl(CF_2)_nCCl_2OOC(CF_2)_mX + 4RNH_2$$
$$\rightarrow Cl(CF_2)_nCONHR + X(CF_2)_mCONHR + 2RNH_3Cl$$

Normally, esters can be hydrolyzed to give the acid and alcohol corresponding to those portions of the original ester. With the novel chlorinated carboxylic esters of this invention, hydrolysis leads to 2 moles of acid and 2 moles of HCl:

$$Cl(CF_2)_nCCl_2OOC(CF_2)_mX + 2H_2O$$
$$\rightarrow Cl(CF_2)_nCOOH + X(CF_2)_mCOOH + 2HCl$$

The new chlorinated carbonate esters are similar in properties and reactivities to the new carboxylate esters, except that they act as trimeric acid chlorides, i.e. as two moles of acid chlorides like the chlorinated carboxylate esters and in addition as one mole of phosgene. They react with alcohols to yield two moles of new esters of said alcohols and the acids derived from the alcohol portions of the carbonate esters and one mole of dialkyl carbonate, e.g. diethyl carbonate of known commercial utility, according to the equation:

$$[Cl(CF_2)_n-CCl_2-O-]_2CO + 4ROH \longrightarrow$$
$$2Cl(CF_2)_n-COOR + R-O-\overset{O}{\underset{\|}{C}}-O-R + 4HCl$$

wherein R represents an alkyl radical. With amines, they react to form two moles of the amides of acids derived from the alcohol portions of the esters and one mole of an urea derivative, e.g. urea with ammonia, according to the following equation:

$$[Cl(CF_2)_n-CCl_2-O-]_2CO + 8RNH_2 \longrightarrow$$
$$2Cl(CF_2)_n-CO-NHR + RHN-\overset{O}{\underset{\|}{C}}-NHR + 4RNH_3Cl$$

wherein R represents H or an organic radical. They react with water to form two moles of acids derived from the alcohol portions of the esters and one mole of carbon dioxide, according to the following equation:

$$[Cl(CF_2)_n-CCl_2-O-]_2CO + 3H_2O$$
$$\rightarrow 2Cl(CF_2)_nCOOH + CO_2 + 4HCl$$

The following are representative of the aforesaid new chlorinated esters of this invention:

Bis(1,1,5-trichloroperfluoropentyl) carbonate
Bis(1,1,7-trichloroperfluoroheptyl) carbonate
1,1,2-trichloro-2,2-difluoroethyl difluorochloroacetate
1,1,2-trichloro-2,2-difluoroethyl trifluoroacetate
1,1,5-trichloroperfluoropentyl 5-chloroperfluorovalerate
1,1,7-trichloroperfluoroheptyl 7-chloroperfluoroheptanoate
1,1,7-trichloroperfluoroheptyl perfluorobutyrate
1,1,9-trichloroperfluorononyl 9-chloroperfluorononanoate
1,1,11-trichloroperfluoroundecyl perfluorobutyrate
1,1,13-trichloroperfluorotridecyl 13-chloroperfluorotridecanoate
1,1,13-trichloroperfluorotridecyl 17-chloroperfluoroheptadecanoate
1,1,17-trichloroperfluoroheptadecyl 17-chloroperfluoroheptadecanoate In order to more clearly illustrate this invention, preferred modes of practicing it, and preferred new compounds and their novel properties and reactivities, the following examples are given wherein the proportions and amounts are by weight except where specifically stated otherwise:

EXAMPLE 1

*Chlorination of Bis(1,1,5-Trihydroperfluoropentyl) Carbonate and Bis(1,1,5-Trihydroperfluoropentyl) Oxalate and Pyrolysis of Products*

In a 1-liter flask fitted with gas inlet and outlet tubes above the liquid level is stirred a mixture of 665 parts (2.86 moles) of 1,1,5-trihydroperfluoropentan-1-ol and 232 parts (2.94 moles) of pyridine. Phosgene is passed into the flask with vigorous stirring and the flask is cooled externally to maintain an inside temperature of 35° C. A precipitate of pyridine hydrochloride forms but does not interfere with the stirring. A total of 163 parts (1.65 moles) of phosgene are added during 4½ hours. 200 parts of crushed ice is then added to dissolve the pyridine hydrochloride and the layers are separated. The flask is rinsed with 150 parts of chloroform which is also used to extract the aqueous layer. The combined organic layer is dried over drierite and distilled through a packed column to yield 549 parts of bis(1,1,5-trihydroperfluoropentyl) carbonate, B.R. 85-88° C. at a pressure of 1.3 mm. of mercury, $n_D^{25}=1.3270$.

*Analysis.*—Calc'd for $C_{11}H_6F_{16}O_3$: C, 26.95; H, 1.23; M.W., 490.16; M.P. 56.29° C. Found: C, 22.09, 22.24; H, 1.23, 1.49; M.W., 525, 460; M.P. 58.3° C.

A sample of 30.04 parts (0.0613 mole) of the above carbonate ester in "Pyrex" glass equipment is irradiated with a sun lamp as an ultra-violet light source, while passing a slow stream of chlorine gas through it. The sun lamp maintains the liquid system at 65-70° C. Chlorine flow rate is adjusted so that a pale yellow color of dissolved chlorine is maintained in the liquid, with negligible chlorine gas color in the off gases. Off gases are scrubbed through a concentrated aqueous solution of potassium iodide. Initial chlorine absorption is rapid, with slowing of the absorption rate after seven hours. Absorption is called complete when, with no chlorine feed, appreciable yellow color of chlorine remains after two hours heating and irradiation.

Analysis of the absorber solution shows 0.365 equivalent of HCl had evolved (theory=6×0.0613=0.368 eq.), with 0.5 mole of free chlorine passing through the system unreacted. Weight of the bis(1,1,5-trichloroperfluoropentyl) carbonate is 40.61 parts (theory=42.6 parts). It solidifies on cooling to 47–50° C. to a white solid.

The crude 1,1,5-trichloro ester is distilled directly under reduced pressure through an 18-inch spinning band column (about 15–20 plates). A marked decomposition occurs at a heating bath temperature of about 140° C., to give three cuts condensing at room temperature and two fractions condensing in a second receiver at solid $CO_2$ temperatures, as follows:

| Cut | Receiver temp. | B.R. (press.) | Wt. (parts) | $n_D^{25}$ |
|---|---|---|---|---|
| 1 | Room temp | 44-58 (8 mm.) | 9.25 | 1.3683 |
| 2 | Solid $CO_2$ | | 8.48 | 1.3280 |
| 3 | Room temp | 27-48 (1 mm.) | 1.51 | 1.3782 |
| 4 | Room temp | 65-96 (1 mm.) | 13.51 | 1.3638 |
| 5 | Solid $CO_2$ | | 6.69 | 1.3379 |
| Residue | | | 0.5 | |

The two volatile fractions (cuts 2 and 5) smell strongly of phosgene. Combination of the volatile fractions and redistillation of 14.1 parts give 12.6 parts of colorless product with an acrid odor, B.P. 93° C. at 760 mm., $n_D^{25}=1.3283$, with 1.02 parts of residue from run-back, $n_D^{25}=1.3305$. The residue has a saponification equivalent of 151.

*Analysis of the distillate yields.*—Found: Total Cl=24.3, 24.4%; hydrolyzable Cl=13.3, 13.6%. Calc'd for Cl(CF₂)₄COCl: sap. equiv.=150; total Cl=23.7%; hydrolyzable Cl=11.9%.

Fractions 1, 3 and 4 are combined (22.2 parts total) and redistilled at 1.5–2.5 mm. to give 19.2 parts of crude 5-chloroperfluorovaleryl chloride, $n_D{}^{25}=1.3346$, smelling strongly of phosgene, and 0.08 part residue. Redistillation of 18.6 parts of the crude acid chloride gives 15.4 parts, B.P. 96° C. at 1 atmosphere pressure, $n_D{}^{25}=1.3280$, and 0.64 part of residue.

The overall reaction is given below:

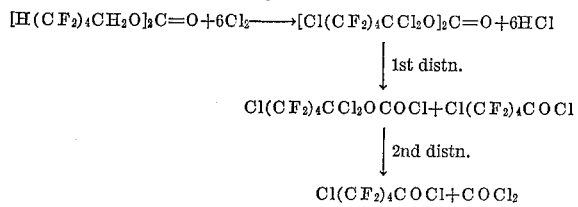

Isolated yield of distilled 5-chloroperfluorovaleryl chloride is 28.0 parts, or 76.5% yield.

In the same way, 5-chloroperfluorovaleryl chloride is obtained from bis(1,1,5-trihydroperfluoropentyl) oxalate.

EXAMPLE 2

*Preparation of Bis(1,1,7-Trichloroperfluoroheptyl) Carbonate and Pyrolysis Thereof*

430.4 parts (0.623 mole) of bis(1,1,7-trihydroperfluoroheptyl)carbonate in "Pyrex" glass equipment is irradiated with a sun lamp as an ultra-violet light source, while passing a slow stream of chlorine gas through it. The temperature of the liquid system is maintained at 85°–135° C. Chlorine flow rate is adjusted so that a pale yellow color of dissolved chlorine is maintained in the liquid, with negligible chlorine gas color in the off gases. Off gases are scrubbed through water, analysis of which indicated that at least 3.06 equivalents of HCl are evolved (theory=6×0.623=3.74 eq.). The resulting bis(1,1,7-trichloroperfluoroheptyl) carbonate is a white solid melting at about 47° C.

*Analysis.*—Calc'd. for $C_{15}F_{24}Cl_6O_3$: Cl, 23.7. Found: Cl, 23.0.

The bis(1,1,7-trichloroperfluoroheptyl) carbonate is distilled and thermally cleaved at heating bath temperatures of 165–225° C. at atmospheric pressure to give 476.3 parts of 7-chloroperfluoroheptanoyl chloride. Redistillation yields 431.2 parts (86% yield) of pure 7-chloroperfluoroheptanoyl chloride, B.P. 142° C., $n_D{}^{25}$ 1.3267.

EXAMPLE 3

*Chlorination of 1,1,7-Trihydroperfluoroheptyl Acetate and Pyrolysis of Product*

A 20.0 part (0.0535 mole) sample of 1,1,7-trihydroperfluoroheptyl acetate, B.P. 176° C. at 1 atmosphere, $n_D{}^{25}=1.3221$, is treated with 48 parts of chlorine (theory=22.8 parts) under sun lamp irradiation at 117–135° C. Off gases are passed to a water scrubber after passage through an ice-cooled receiver which collects most of the material carried off by the volatile HCl (i.e. small amounts of acid chloride formed by some decomposition during chlorination). After four, eleven and seventeen hours, 0.201, 0.283 and 0.347 equivalent of acid evolves, respectively (theory=6×0.0535=0.321 equivalent). Chlorine feed is stopped and the reactor contents are pyrolyzed by distillation in a two-bulb still at 1 atmosphere, where 19.4 parts of non-volatilized chlorination product gives 18.3 parts of crude acid chloride, B.R. 103–155° C. at 1 atmosphere at a pot temperature of 194–280° C., and 0.3 part of residue. This crude acid chloride is combined with 3.3 parts of acid chloride fraction previously condensed in the ice-cooled receiver. This combination is refractionated through the spinning band still, to give cut I, 5.8 parts, B.R. 101–104° C. at 1 atmosphere, $n_D{}^{25}=1.3517$; cut II, 11.4 parts, B.R. 135–8° C. at 1 atmosphere, $n_D{}^{25}=1.3303$; and 4.0 parts of residue (to a bath temperature of 200° C. at 1 atmosphere), $n_D{}^{25}=1.4070$.

The major fraction, cut II, consisting of 7-chloroperfluoroheptanoyl chloride, gives the following analysis:

Found: Neutral equiv.=209.3, 208.9; total Cl=20.0, 20.1%; hydrolyzable Cl=7.7, 7.4%. Calc'd. for $C_7Cl_2F_{12}O$: Neutral equiv.=200; total Cl=17.8%; hydrolyzable Cl=8.9%.

EXAMPLE 4

*Chlorination of Bis(1,1,7-Trihydroperfluoroheptyl) Methylphosphonate and Pyrolysis of Product*

A 16.4 part (0.0226 mole) sample of bis(1,1,7-trihydroperfluoroheptyl) methylphosphonate, B.P. 157.0° C. at 1.0 mm., $n_D{}^{25}=1.3357$, is treated with chlorine as described in Example 1 under sun lamp irradiation at 100–130° C., until a permanent yellow color forms. After 5, 13, and 21 hours, 0.120, 0.201 and 0.277 eq. acid, respectively, are found in the water scrubber (theory=9×0.0226=0.203 eq.)

The material in the reaction vessel is pyrolyzed by distillation at 1 atmosphere pressure in a two-bulb still, to give 13.6 parts B.R. 116–270° C. at pot temperature of 138–338° C., and 1.4 parts of residue. The crude acid chloride (13.1 parts) is fractionated in the spinning band still to give cut I, 1.62 parts, B.P. 85° C. at 1 atmosphere, $n_D{}^{25}=1.3350$; cut II, 1.95 parts, B.R. 107–8° C. at 1 atmosphere, $n_D{}^{25}=1.3200$; cut III, 4.0 parts, B.R. 36–8° C. at 13 mm., $n_D{}^{25}=1.3278$, and 4.19 parts of viscous residue.

The desired product, cut III, consisting of 7-chloroperfluoroheptanoyl chloride, gives the following analysis:

Found: Neutral equiv.=197.7, 198.4; total Cl=18.1, 18.1%. Calc'd for $C_7Cl_2F_{12}O$: Neutral equiv.=200; total Cl=17.8%.

EXAMPLE 5

*Chlorination of the Mixed Primary and Secondary Acid Phosphates of 1,1,7-Trihydroperfluoroheptan-1-Ol, and Pyrolysis of Product*

A sample of 28.0 parts of the mixed crude acid phosphates, prepared by treating $P_2O_5$ with 1,1,7-trihydroperfluoroheptan-1-ol by the method of United States Patent 2,597,702, Example IV, is treated with chlorine under sun lamp illumination at 97–145° C. while a total of 40 parts of chlorine is added in 14 hours. Evolved acid slowly increases to 0.255 equivalent. Material in the reaction vessel (22.0 parts) is transferred to a two-bulb still and pyrolyzed as in Example 1, to give 13.2 parts of volatile product, B.R. 115–127° C. at 1 atmosphere, with pot temperature of 146–260° C., and 8.2 parts of residue. Fractionation of 12.8 parts of the volatile material gives cut I, 5.2 parts, B.R. 104–110° C. at 1 atmosphere, $n_D{}^{25}=1.3149$; cut II, 0.54 part, B.P. 93° at 1 atmosphere; cut III, 2.1 parts, B.P. 44° C. at 18 mm., $n_D{}^{25}=1.3288$; and 3.8 parts of residue. Cut III contains a substantial amount of 7-chloroperfluoroheptanoyl chloride as shown by analysis.

EXAMPLE 6

*Chlorination of Bis(1,1,7-Trihydroperfluoroheptyl) Dimethylsilanate and Pyrolysis of Product*

A 20.1 part (0.0278 mole) sample of bis(1,1,7-trihydroperfluoroheptyl) dimethylsilanate, B.R. 171–3° C. at 0.45 mm., $n_D{}^{25}=1.3253$, is treated with chlorine under sun lamp irradiation at 106–122° C. for 14 hours until the yellow color fades very slowly. A total of 27 parts of chlorine is passed through, and 0.257 eq. acid is collected (theoretical maximum=12×0.0278=0.334 eq.). Heavy reflux sets in after two hours. The reactor contents are then pyrolyzed as in the previous examples. 16.0 parts of crude chlorinated mixture give 10.8 parts of volatile material, B.R. 105–116° C. at 1 atmosphere, at pot temperature of 140–180° C. and a white solid residue of 5.2 parts. The volatile material is combined with 3.2 parts of product from the ice trap on the exit HCl line, and fractionated, giving cut I, 0.84 part, B.P. 85–6° C. at 1 atmosphere; cut II, 10.4 parts, B.P. 109° C. at 1 atmosphere, $n_D^{25}=1.3080$, with an acid odor; and 1.5 parts of residue, $n_D^{25}=1.3265$, which is substantially 7-chloroperfluoroheptanoyl chloride.

EXAMPLE 7

Chlorination of 1,1,5-Trihydroperfluoropentyl 5-Hydroperfluorovalerate and Pyrolysis of 1,1,5-Trichlororoperfluoropentyl 5-Chloroperfluorovalerate In a reaction vessel (12″ x 3″ in size) containing an internal ultraviolet light source (mercury vapor in quartz tubing) is placed 245.6 parts (0.534 mole) of 1,1,5-trihydroperfluoropentyl 5-hydroperfluorovalerate, B.R. 92.5–94.5° C. at 17 mm. of mercury. Chlorine is dispersed through a sintered disc at the bottom of the reaction vessel and the exit gases are conducted directly through a Dry Ice cooled trap and the non-condensed gas bubbled into water (i.e. the HCl evolved is thus titrated to follow the course of reaction). 195 parts of chlorine is thereby fed to the vessel over a 4-hour period at 115–128° C. Analysis of the absorber solution shows 1.74 moles of HCl (82% of theory) evolved. A sample of the reaction mixture on analysis contains 23% chlorine and 10.4% hydrolyzable chlorine. Theory for $C_{10}Cl_4F_{16}O_2$ is 23.7% Cl and 11.8% hydrolyzable Cl. 14.0 parts of additional chlorine is passed in for ½ hour at 116–123° C. of which 7.0 parts react, making a total of 145.5 parts of chlorine actually consumed. The crude 1,1,5-trichloroperfluoropentyl 5-chloroperfluorovalerate, weighing 311 parts (97.6% of theory), is obtained. Distillation of the crude product in a 3-foot spinning band column yields 193 parts of very pure 1,1,5-trichloroperfluoropentyl 5-chloroperfluorovalerate, B.R. 99–101° C. at 11 mm.; $n_D^{25}=1.3513$. Analysis for chlorine: found, 24.1%; hydrolyzable Cl, 11.8; calc'd for $C_{10}Cl_4F_{16}O_2$, Cl 23.7%; hydrolyzable Cl, 11.8; and infrared spectrum showing no C—H bonds and the presence of a single strong C=O bond at 5.45 microns.

A 5.98 part (0.010 mole) sample of the above 1,1,5-trichloroperfluoropentyl 5-chloroperfluorovalerate is stirred under a 16-inch tantalum spinning band column while the reaction vessel is heated with an oil bath. Slow refluxing occurs at bath temperature of 214° C. Under high reflux with the bath at 221–235° C. over a 1-hour period, 5.4 parts (90% of theory) of 5-chloroperfluorovaleryl chloride, B.P. 98° C., $n_D^{25}=1.3260$, is obtained by distillation.

EXAMPLE 8

Pyrolysis of 1,1,5-Trichloroperfluoropentyl 5-Chlorovalerate in Presence of Sodium Fluoride A mixture of 5.0 parts (0.084 mole) of 1,1,5-trichloroperfluoropentyl 5-chloroperfluorovalerate prepared in Example 7, 1.7 parts (0.17 mole) of sodium fluoride pellets and about 5 parts of tetramethylenesulfone is heated at 100° C. in a small short-path distilling flask with a cold finger in the shape of a cup, the flask being set in an oil bath. Reaction in the vicinity of the NaF pellets occurs immediately. The pellets are crushed with a stirring rod, and the liquid-collecting cup (cold cup) is returned in place over the reaction mixture. Liquid collects in the cup with the bath at 107–115° C. The cup fills in ½ hour. The liquid is transferred to a small distilling pot, and the process is repeated two times. The total amount of 5-chloroperfluorovaleryl chloride recovered is 3.8 parts, $n_D^{25}=1.3270$ (76% of theory). Distillation of the acid chloride through a 16-inch tantalum spinning band column yields 2.08 parts of 5-chloroperfluorovaleryl chloride, B.P. 101° C., $n_D^{25}=1.3271$. Its identity is confirmed by infrared spectrum and analysis:

Analysis.—Calc'd for $C_5F_8Cl_2O$: C, 20.1; F, 50.9; Cl, 23.7 Found: C, 20.6; F, 54.2; Cl, 24.0. IR spectrum shows the carbonyl band of COCl at 5.52 microns.

EXAMPLE 9

Preparation of 1,1,7-Trichloroperfluoroheptyl 7-Chloroperfluoroheptanoate and Pyrolysis Thereof Following the method of Example 7, 24.3 parts (0.037 mole) of 1,1,7-trihydroperfluoroheptyl 7-hydroperfluoroheptanoate is treated with a slight excess of chlorine at 115–119° C. for 4 hours. The crude product weighing 27.7 parts (95% of theory) is then distilled in a 16-inch spinning-band column to give 19 parts (66% yield) of 1,1,7 - trichloroperfluoroheptyl 7 - chloroperfluoroheptanoate, B.P. 138° C. at 12 mm. or 86° C. at 0.6 mm.; $n_D^{25}=1.3422$.

Analysis.—Calc'd for $C_{14}Cl_4F_{24}O_2$: C, 21.1; F, 57.1; Cl, 17.76. Found: C, 20.7; F, 57,25; Cl, 17.5. IR spectrum shows the absence of C—H bonds and the presence of a single strong C=O bond at 5.45 microns.

55.0 parts (0.069 mole) of the above 1,1,7-trichloroperfluoroheptyl 7-chloroperfluoroheptanoate and 1.0 part of sodium fluoride catalyst are heated under a reflux column for one hour at 190° C. The acid chloride, formed by thermal decomposition, is distilled, B.P. 138–9° C.; $n_D^{25}=1.3267$. 36.4 parts, representing a conversion of 66%, of 7-chloroperfluoroheptanoyl chloride is obtained. 25 parts (0.062 mole) of 7-chloroperfluoroheptanoyl chloride is refluxed with 1.12 parts (0.06 mole) of water in methylene chloride for 4 hours in order to hydrolyze the acid chloride. A portion of the crystalline acid, 12.4 parts, is collected under a dry atmosphere. Its melting point is 37–37.8° C. The remaining acid in solution is distilled in a 16-inch spinning band column yielding 8.7 parts of 7-chloroperfluoroheptanoic acid, B.P. 195–6° C.; M.R. 41.7–44.1° C.

Analysis.—Calc'd for $C_7F_{12}ClO_2H$: Cl, 9.4. Found: Cl, 9.4.

EXAMPLE 10

Chlorination of 1,1,9-Trihydroperfluorononyl 9-Hydroperflorononanoate and Pyrolysis of 1,1,9-Trichloroperfluorononyl 9-Chloroperfluorononanoate 99 parts (0.115 mole) of 1,1,9-trihydroperfluorononyl 9-hydroperfluorononanoate, B.P. 146° C. at 4.5 mm., M.P. 46° C. is treated with 71 parts (1.0 mole) of chlorine as described in Example 7. The chlorination is carried out at 140–150° C. There was obtained a good yield of pure 1,1,9 - trichloroperfluorononyl 9 - chloroperfluorononanoate, B.P. 126° C. at 0.8 mm.; $n_D^{25}=1.3391$. Infrared spectrum shows the absence of C—H bonds and the presence of a C=O bond at 5.45 microns.

The resulting 1,1,9-trichloroperfluorononyl 9-chloroperfluorononanoate is thermally cleaved by distilling in the temperature range of 182–227° C. at 10 mm. pressure through a 3-foot spinning band column. 83.1 parts (75% yield) of 9-chloroperfluorononanoyl chloride, B.P. 66° C. at 10 mm., $n_D^{25}=1.3262$, is obtained. One redistillation yields a B.P. 82° C. at 23 mm.

Analysis.—Calc'd for $C_9F_{16}Cl_2O$: C, 21.65; F, 60.95; Cl, 14.21. Found: C, 21.6; F, 60.90; Cl, 14.40.

This 9-chloroperfluorononanoyl chloride is reacted with 1,1,9-trihydroperfluorononan-1-ol to prepare the monochloro ester, 1,1,9-trihydroperfluorononyl 9-chloroperfluorononanoate, M.P. 52° C., B.P. 153° C. at 5 mm. This ester is further chlorinated to the tetrachloro ester which is pyrolyzed to yield approximately two additional moles of 9-chloroperfluorononanoyl chloride.

EXAMPLE 11

Preparation of 1,1,7-Trichloroperfluoroheptyl Perfluorobutyrate

Following the method of Example 7, 46.5 parts (0.088 mole) of 1,1,7-trihydroperfluoroheptyl perfluorobutyrate, B.P. 93.5° C. at 20 mm.; $n_D^{25}=1.3051$, is photochlorinated at 120° C. for 4 hours wherein 3.4 parts of chlorine is absorbed. The crude product is distilled in a 3-foot spinning-band column to give 45.8 parts (82.4% yield) of pure 1,1,7-trichloroperfluoroheptyl perfluorobutyrate, B.P. 86° C. at 5 mm.; $n_D^{25}=1.3331$.

*Analysis.*—Calc'd for $C_{11}F_{19}Cl_3O_2$: C, 20.9; Cl, 16.9. Found: C, 20.8; Cl, 17.3. IR spectrum shows the absence of C—H bonds.

EXAMPLE 12

*Preparation of 1,1,11-Trichloroperfluoroundecyl Perfluorobutyrate*

Following the method of Example 7, 35 parts (0.048 mole) of 1,1,11 - trihydroperfluoroundecyl perfluorobutyrate (M.P. 27–8° C.; B.P. 134° C. at 18 mm.) is photochlorinated at 112–140° C. passing in 14 parts of chlorine over a six-hour period. The crude product, weighing 37.0 parts, is distilled through a 16-inch tantalum spinning-band column to obtain 21 parts of 1,1,11-trichloroperfluoroundecyl perfluorobutyrate, B.P. 130° C. at 15 mm. (decomposing slightly) or 93° C. at 0.8 mm.; $n_D^{25}=1.3312$.

*Analysis.*—Calc'd for $C_{15}F_{27}O_2Cl_3$: C, 21.7; F, 61.7; Cl, 12.8. Found: C, 22.1; F, 63.6; Cl, 12.8. IR spectrum shows the absence of C—H bonds and the presence of a strong C=O bond at 5.45 microns.

During the distillation at about 130° C., a portion of the ester pyrolyzes to the acid chloride (1) perfluorobutyryl chloride (collects in the Dry Ice trap) and (2) 1.3 parts of 11-chloroperfluoroundecanoyl chloride, B.P. 95° C. at 28 mm.; M.P. 54.5° C.

*Anaylsis.*—Calc'd for $C_{11}F_{20}Cl_2O$: Cl, 11.8. Found: Cl, 12.2.

EXAMPLE 13

*Reaction of 1,1,5-Trichloroperfluoropentyl 5-Chloroperfluorovalerate With Ethanol*

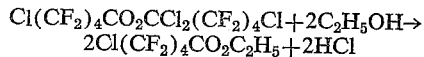

$$Cl(CF_2)_4CO_2CCl_2(CF_2)_4Cl + 2C_2H_5OH \rightarrow 2Cl(CF_2)_4CO_2C_2H_5 + 2HCl$$

When 25.0 parts (0.5 mole) of absolute ethanol is slowly added to 119.5 parts (0.2 mole) of 1,1,5-trichloroperfluoropentyl 5-chloroperfluorovalerate, prepared in Example 7, over a period of 25 minutes and at 62° C., hydrogen chloride rapidly evolves. The reaction mixture is heated at 85° C. for 2 hours and then fractionated through a 16-inch tantalum spinning-band column yielding 12.2 parts of (excess) ethanol and 122 parts (97% yield) of ethyl 5-chloroperfluorovalerate, B.P. 146° C.; $n_D^{25}=1.3347$.

*Analysis.*—Calc'd for $C_7F_8H_5ClO_2$: C, 26.7; F, 48.3; Cl, 11.3 Found: C, 27.0; F, 48.8; Cl, 11.7.

EXAMPLE 14

*Reaction of 1,1,5-Trichloroperfluoropentyl 5-Chloroperfluorovalerate With Ammonia*

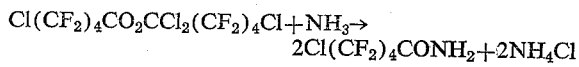

$$Cl(CF_2)_4CO_2CCl_2(CF_2)_4Cl + NH_3 \rightarrow 2Cl(CF_2)_4CONH_2 + 2NH_4Cl$$

When 0.7 part of 1,1,5-trichloroperfluoropentyl 5-chloroperfluorovalerate, prepared in Example 7, is dissolved in about 9 parts of benzene and treated with excess ammonia, a copious white precipitate of ammonium chloride is deposited. The reaction mixture of filtered hot to remove the NH₄Cl. The filtrate is then cooled and the crystals which form are collected on a filter. After drying, the product weighs 0.53 part (80% yield) and melts at 124.5° C. The product is the amide of 5-chloroperfluorovaleric acid.

*Analysis.*—Calc'd for $C_5H_2F_8ClNO$: N, 5.0; Cl, 12.7; F, 54.4; C, 21.5. Found: N, 5.2; Cl, 12.4; F, 54.4; C, 21.5.

EXAMPLE 15

*Reaction of 1,1,7-Trichloroperfluoroheptyl 7-Chloroperfluoroheptanoate With Water*

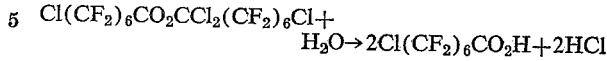

$$Cl(CF_2)_6CO_2CCl_2(CF_2)_6Cl + H_2O \rightarrow 2Cl(CF_2)_6CO_2H + 2HCl$$

When 1.0 part of 1,1,7-trichloroperfluoroheptyl 7-chloroperfluoroheptanoate, prepared in Example 9, is warmed with 3.0 parts of water (an excess) and allowed to stand, hydrogen chloride is evolved. A crystalline material forms which is extracted with trichlorotrifluoroethane. The organic solution is then chilled and filtered, resulting in the collection of 0.5 part of 7-chloroperfluoroheptanoic acid, M.R. 42.5–43.6° C.

In a similar manner, 1,1,9-trichloroperfluorononyl 9-chloroperfluorononanoate, prepared in Example 10, is reacted with water to yield 9-chloroperfluorononanoic acid, M.R. 83°–84° C.

*Analysis.*—Calc'd for $C_9F_{16}ClO_2H$: C, 22.5; F, 63.2; Cl, 7.38; N.E., 481. Found: C, 22.45; F, 63.15; Cl, 7.50; N.E., 486.

EXAMPLE 16

*9-Chloroperfluorononanoic Acid*

A 33.05 part (0.0742 mole) sample of crude 9-hydroperfluorononanoic acid, neutral equivalent 476 (theory 446), M.R. 64.5–65.5° C. is treated with chlorine while being irradiated with a sun lamp as an ultra-violet light source. The sample is entirely liquid above 60° C., and reacts rapidly with chlorine above 80° C. Temperature is accordingly held at 95–105° C. for the balance of the reaction. Off gas is scrubbed through water. Chlorine feed is continued until a yellow color persists for two hours with chlorine feed turned off (9 hours total), at which point 13 parts of chlorine has been fed. The crude product solidifies at 68–9° C. on cooling. Distillation of the crude gives 32.8 parts of white solid distillate, B.P. 110–111° C. at 7.5 mm., M.R. 80–81.5° C., and 1.01 g. residue.

*Analysis.*—Calc'd for $Cl(CF_2)_8COOH$: Neutral equivalent 480; Cl=7.39%. Found: Neutral equivalent 478, 480; Cl=7.4, 7.5%.

EXAMPLE 17

*3-Chloroperfluoropropionic Acid*

A 16.7 part (0.115 mole) sample of 3-hydroperfluoropropionic acid, B.R. 130–136° C. at 1 atmosphere, $n_D^{25}=1.3235$, neutral equivalent 146, is chlorinated at 120–135° C. as above for 31 hours, giving a total of 20.4 parts of crude product (theory=20.7 parts). This material (19.98 parts) is fractionated through the 18-inch spinning band column, giving 17.9 parts of clear product, B.R. 130–131° C. at 1 atmosphere, $n_D^{25}=1.3418$, and 1.5 parts of residue.

*Analysis.*—Calc'd for $ClCF_2CF_2COOH$: Neutral equivalent=180.5; Cl=19.7%; F=42.1%; Cl/F=1/4. Found: Neutral equivalent=178.5, 177.5; Cl=22.1, 22.2; F=40.0, 40.2%; Cl/F=1/3.46.

The ω-chloroperfluoroalkanoic acids, disclosed by Brice et al. in United States Patent 2,790,815, may also be prepared by related photochlorination of ω-hydroperfluoroalkanoic acids, as demonstrated in Examples 16 and 17.

It will be understood that the foregoing examples are given solely for illustrative purposes, and that this invention is not restricted to the specific embodiments disclosed therein. On the other hand, it will be apparent to those skilled in the art that many variations and modifications, within the limits set forth in the general description, can be made without departing from the spirit or scope of this invention.

From the foregoing description and examples, it will be apparent that this invention provides a novel process for preparing highly fluorinated acid chlorides and a novel class of chlorinated highly fluorinated esters which have unusual and surprising valuable properties and reactivities whereby they are useful for a wide variety of purposes. Therefore, it is obvious that this invention constitutes a valuable contribution to the art.

The embodiments of the invention in which an exclusive property or privilege is claimed are defined as follows:

1. A process for preparing an acid chloride of the formula

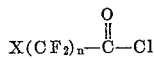

wherein X is a member of the group consisting of chlorine and $n$ is an integer of from 1 to 22, which process comprises pyrolyzing at a temperature in the range of from about 100° C. to about 350° C. an ester having a structure selected from the group consisting of

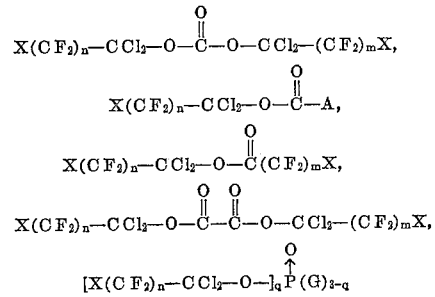

and

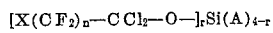

wherein each X is a member of the group consisting of Cl and F, each of $n$ and $m$ is an integer of from 1 to 22, A represents a member of the group consisting of methyl and chlorine-substituted methyl radicals, G represents a member of the group consisting of OH, Cl, methyl and chlorine-substituted methyl radicals, $q$ is an integer of from 1 to 3, and $r$ is an integer of from 1 to 4.

2. A process for preparing an acid chloride of the formula

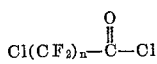

wherein $n$ is an integer of from 1 to 22, which process comprises pyrolyzing at a temperature in the range of from about 100° C. to about 350° C. an ester having the structure

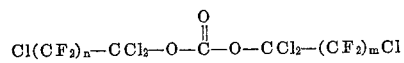

wherein each of $n$ and $m$ is an integer of from 1 to 22.

3. A process for preparing an acid chloride of the formula

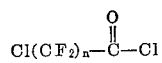

wherein $n$ is an integer of from 1 to 22, which process comprises pyrolyzing at a temperature in the range of from about 100° C. to about 350° C. an ester having the structure

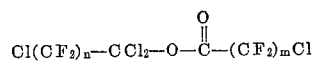

wherein each of $n$ and $m$ is an integer of from 1 to 22.

4. A process for preparing acid chlorides of the formula

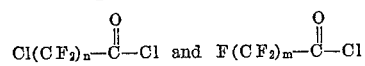

wherein each of $n$ and $m$ is an integer of from 1 to 22, which process comprises pyrolyzing at a temperature in the range of from about 100° C. to about 350° C. an ester having the structure

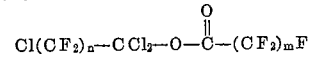

wherein each of $n$ and $m$ is an integer of from 1 to 22.

5. A process for preparing an acid chloride of the formula

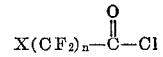

wherein X is a member of the group consisting of chlorine and fluorine and $n$ is an integer of from 1 to 22, which process comprises photochlorinating at a temperature of from about 50° C. to about 150° C. an ester having a structure selected from the group consisting of

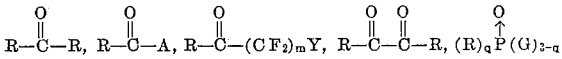

and

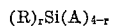

wherein each R represents a radical of the formula $Y(CF_2)_nCH_2$—O— in which Y is a member of the group consisting of H, Cl and F and $n$ is an integer of from 1 to 22, A represents a member of the group consisting of methyl and chlorine-substituted methyl radicals, $m$ is an integer of from 1 to 22, $q$ is an integer of from 1 to 3, $r$ is an integer of from 1 to 4, and G is a member of the group consisting of OH, Cl, methyl and chlorine-substituted methyl radicals, employing at least one mole of chlorine for each hydrogen atom in the ester, and continuing said photochlorination until all hydrogen atoms in the radical R have been replaced by chlorine, and pyrolyzing the resulting chlorinated ester at a temperature in the range of from about 100° C. to about 350° C.

6. A process for preparing an acid chloride of the formula

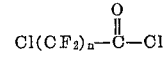

wherein $n$ is an integer of from 1 to 22, which process comprises photochlorinating at a temperature of from about 50° C. to about 150° C. an ester having the structure

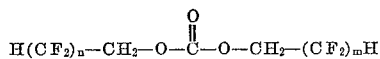

wherein each of $n$ and $m$ is an integer of from 1 to 22, employing at least one mole of chlorine for each hydrogen atom in the ester, and continuing said photochlorination until all hydrogen atoms in the ester have been replaced by chlorine, and pyrolyzing the resulting chlorinated ester at a temperature in the range of from about 100° C. to about 350° C.

7. A process for preparing an acid chloride of the formula

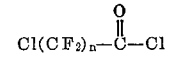

where $n$ is an integer of from 1 to 22, which process comprises photochlorinating at a temperature of from about 50° C. to about 150° C. an ester having the structure

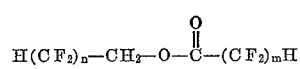

wherein each of $n$ and $m$ is an integer of from 1 to 22, employing at least one mole of chlorine for each hydrogen atom in the ester, and continuing said photochlorination until all hydrogen atoms in the ester have been replaced by chlorine, and pyrolyzing the resulting chlorinated ester at a temperature in the range of from about 100° C. to about 350° C.

8. An ester of the formula

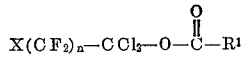

wherein $R^1$ is a radical of the group consisting of —O—$CCl_2$—$(CF_2)_mX$ and —$(CF_2)_mX$, each X is a member of the group consisting of Cl and F, and each of $n$ and $m$ represents an integer of from 2 to 22.

9. A carbonate ester of the formula $$X(CF_2)_n-CCl_2-O-\overset{O}{\underset{\|}{C}}-O-CCl_2-(CF_2)_mX$$

wherein each X represents a member of the group consisting of Cl and F and each of $n$ and $m$ represents an integer of from 2 to 22.

10. A carbonate ester of the formula $$Cl(CF_2)_n-CCl_2-O-\overset{O}{\underset{\|}{C}}-O-CCl_2-(CF_2)_mCl$$

wherein each of $n$ and $m$ represents an integer of from 2 to 22.

11. A carbonate ester of the formula $$Cl(CF_2)_n-CCl_2-O-\overset{O}{\underset{\|}{C}}-O-CCl_2-(CF_2)_mCl$$

wherein each of $n$ and $m$ represents an integer of from about 4 to about 10.

12. Bis(1,1,5-trichloroperfluoropentyl)carbonate.
13. Bis(1,1,7-trichloroperfluoroheptyl)carbonate.
14. A carboxylate ester of the formula $$X(CF_2)_n-CCl_2-O-\overset{O}{\underset{\|}{C}}-(CF_2)_mX$$

wherein each X represents a member of the group consisting of Cl and F and each of $n$ and $m$ represents an integer of from 4 to 10.

15. A carboxylate ester of the formula $$Cl(CF_2)_n-CCl_2-O-\overset{O}{\underset{\|}{C}}-(CF_2)_mCl$$

wherein each of $n$ and $m$ represents an integer of from about 4 to about 10.

16. 1,1,5 - trichloroperfluoropentyl 5 - chloroperfluorovalerate.
17. 1,1,7 - trichloroperfluoroheptyl 7 - chloroperfluoroheptanoate.
18. A carboxylate ester of the formula $$Cl(CF_2)_n-CCl_2-O-\overset{O}{\underset{\|}{C}}-(CF_2)_mF$$

wherein each of $n$ and $m$ represents an integer of from 4 to 10.

References Cited in the file of this patent

UNITED STATES PATENTS

| | | |
|---|---|---|
| 2,816,140 | Ellingboe et al. | Dec. 10, 1957 |
| 2,816,141 | Ellingboe | Dec. 10, 1957 |

FOREIGN PATENTS

| | | |
|---|---|---|
| 527,874 | Germany | June 22, 1931 |

OTHER REFERENCES

Groggins: "Unit Processes in Organic Synthesis," 1952 (Fourth Edition), pages 238–239.

Hauptschein et al.: J. Am. Chem. Soc. 75, 87–89 (1953).

Knunyants et al.: Chemical Abstracts, vol. 43 (1949), pages 6163–6164.

(Copies of above in Scientific Library.)

UNITED STATES PATENT OFFICE
CERTIFICATE OF CORRECTION

Patent No. 3,047,610                                July 31, 1962

Neal O. Brace et al.

It is hereby certified that error appears in the above numbered patent requiring correction and that the said Letters Patent should read as corrected below.

Column 15, line 13, after "chlorine" insert -- and fluorine --.

Signed and sealed this 20th day of November 1962.

(SEAL)
Attest:

ERNEST W. SWIDER
Attesting Officer

DAVID L. LADD
Commissioner of Patents